(12) United States Patent
Rivers et al.

(10) Patent No.: US 6,991,220 B2
(45) Date of Patent: Jan. 31, 2006

(54) RACEWAY LINE PULLER AND METHOD OF USING SAME

(75) Inventors: Paul Brent Rivers, Cullman, AL (US); Frederick James Diggle, III, Birmingham, AL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 12 days.

(21) Appl. No.: 10/777,919

(22) Filed: Feb. 12, 2004

(65) Prior Publication Data

US 2005/0179016 A1    Aug. 18, 2005

(51) Int. Cl.
*B65H 59/00*  (2006.01)
(52) U.S. Cl. ............... 254/134.3 FT; 254/134.3 R
(58) Field of Classification Search ....... 254/134.3 FT, 254/134.3 R, 134.4, 134.5
See application file for complete search history.

(56) References Cited

U.S. PATENT DOCUMENTS

| | | | | |
|---|---|---|---|---|
| 1,114,637 A | * | 10/1914 | Nolan | 403/373 |
| 1,732,410 A | * | 10/1929 | Martin | 403/210 |
| 3,363,879 A | * | 1/1968 | Irik | 254/134.3 FT |
| 6,796,547 B1 | * | 9/2004 | Washburn | 254/134.3 FT |

OTHER PUBLICATIONS

New Tech Industries, Inc., "Fish Tape and Push Pull Rods", webpages, May 17, 2004, http://www.newtechindustries.com/newtech/access/page38d.htm.
TWAcomm.com, "Greenlee 30596—Junior Basket Type Pulling Grip", webpages, May 17, 2004, http://www.twacomm.com/Catalog/Model_30596.htm?SID=NRGND . . . .
U.S. Appl. No. 10/777,413, filed Feb. 12, 2004.
U.S. Appl. No. 10/777,404, filed Feb. 12, 2004.

* cited by examiner

*Primary Examiner*—Lee D. Wilson
(74) *Attorney, Agent, or Firm*—Lee & Hayes, PLLC

(57) ABSTRACT

An apparatus for pulling line through a raceway includes a plurality of interconnected retainer portions and an attachment portion. The plurality of interconnected retainer portions each has a one-way locking passage through the plurality of interconnected retainer portions that are adapted to retain the line. Further, the attachment portion is positioned on an end of the plurality of interconnected retainer portions.

18 Claims, 4 Drawing Sheets

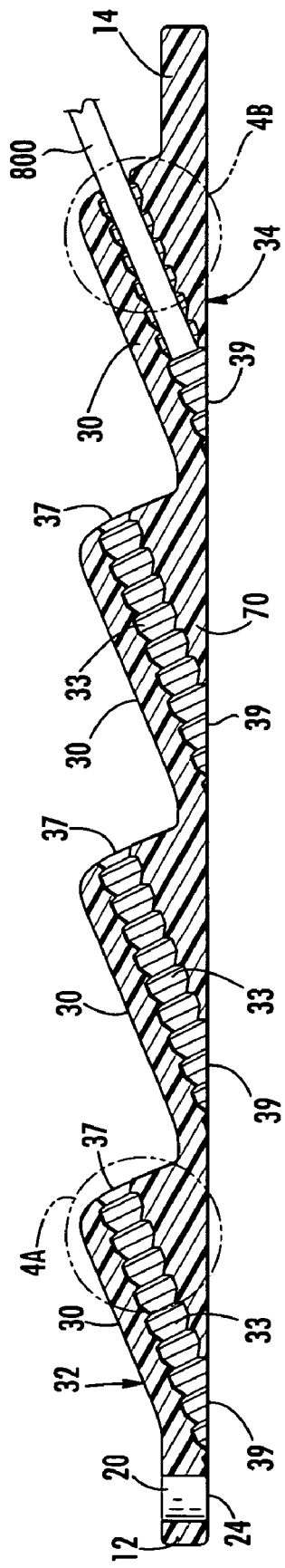
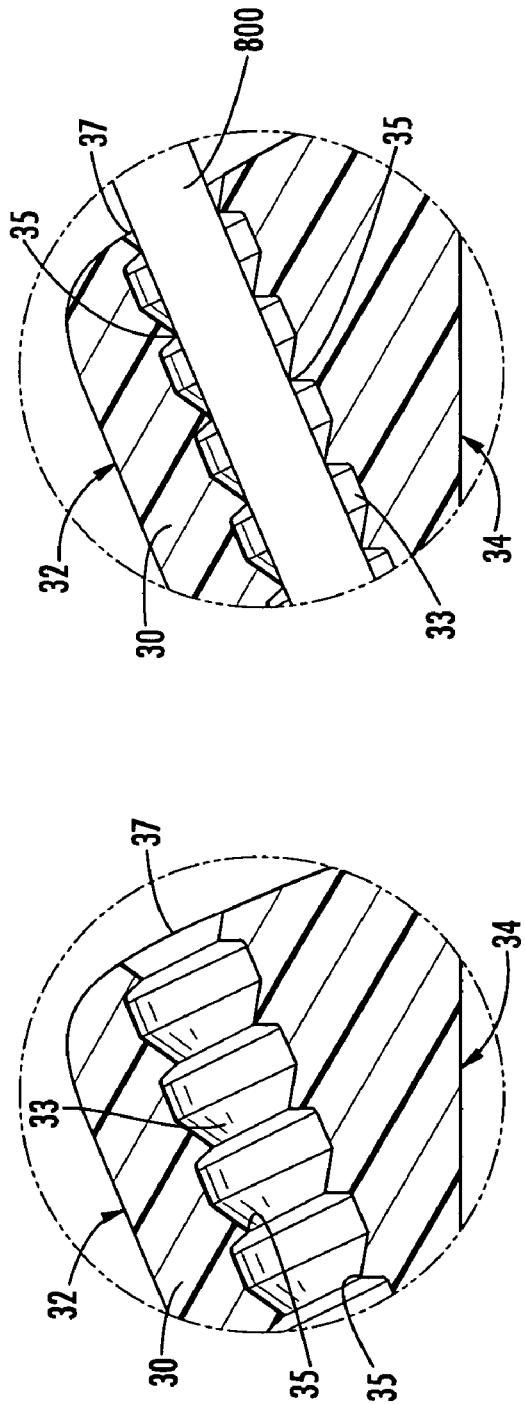

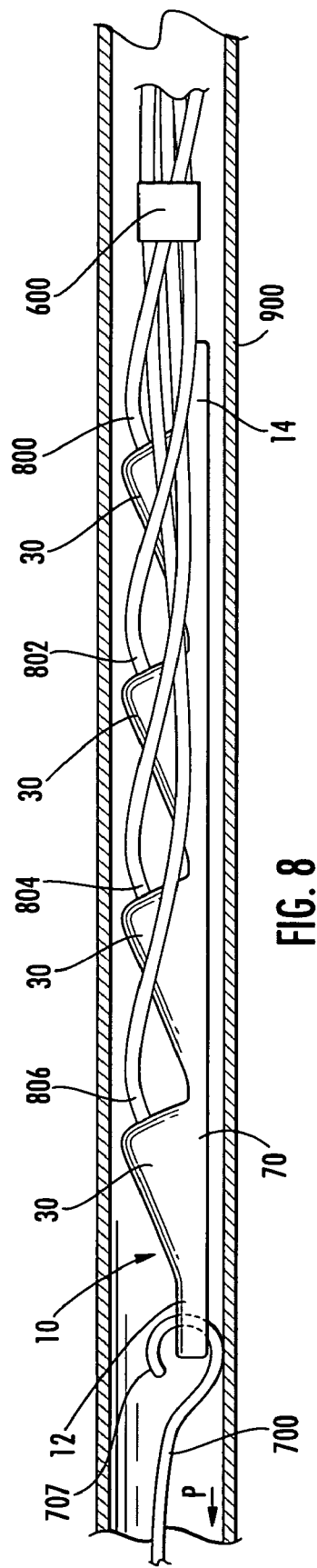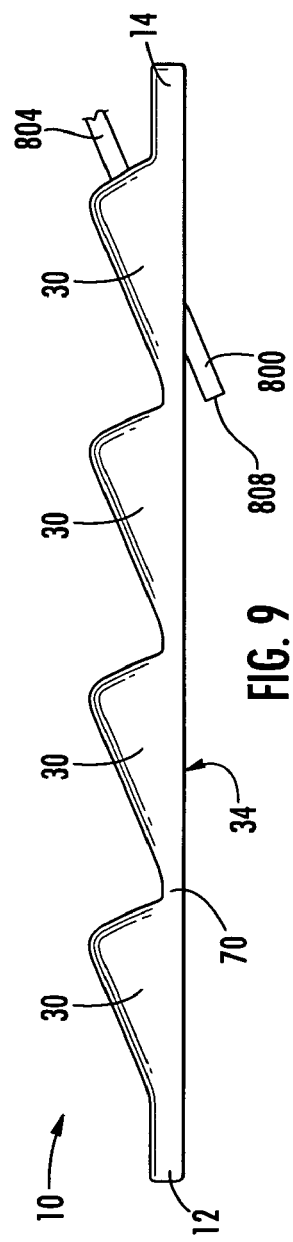

RACEWAY LINE PULLER AND METHOD OF USING SAME

BACKGROUND

The subject invention generally and in various embodiments relates to devices and methods for pulling one or more lines or wires, and more particularly to an apparatus and methods for pulling one or more lines or wires through raceways.

Electricians and/or technicians are often required to install a run of one or more lines or wires (e.g., electrical or communication wire) through lengths of raceways. Raceways may include conduits, ducts and other enclosed channels. A fish tape is commonly sent through the raceway for installing the run of lines or wires. Often, a first line or wire is folded about a tab at an end of the fish tape and taped to itself on the other side where it is doubled over. Then, if necessary, additional lines or wires are taped flush along the first line or wire. The fish tape is then pulled back out of the raceway with the lines or wires attached, with the intent to install the line or wire with the fish tape being removed. This places a tremendous amount of tension on the first line or wire where additional lines or wire are attached. Often the raceway will have angled bends (e.g., 90 degree bends, etc.) and may already have runs of line or wire inside the raceway. With this tension of the first line or wire carrying the additional lines or wires and the possible obstacles, the first line or wire may often pull away from the tab of the fish tape. Further, it is sometimes a challenge to circumvent the obstacles and deviations in the raceway without having lines or wires pull away from the first line or wire due to the lack of strength in the flush securing of the additional lines or wires to the first line or wire.

SUMMARY

Various embodiments of the present invention include an apparatus for pulling line through a raceway. The apparatus includes a plurality of interconnected retainer portions and an attachment portion. The plurality of interconnected retainer portions each has a one-way locking passage through the plurality of interconnected retainer portions that are adapted to retain the line. Further, the attachment portion is positioned on an end of the plurality of interconnected retainer portions.

Various embodiments of the present invention also include a method of pulling line through a raceway. The method includes pushing the line through a one-way locking passage housed in a retainer and attaching an attachment portion of the retainer to an end of a fish tape. The method further includes pulling the fish tape through the raceway.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

In the accompanying Figures, there are shown various embodiments of the present invention wherein like reference numerals are employed to designate like parts and wherein:

FIG. 4 is a cross-sectional view of the line pulling apparatus of FIG. 2 taken along the line 4—4;

FIG. 4A is an enlarged view of a portion of FIG. 4;

FIG. 4B is an enlarged view of a portion of FIG. 4;

FIG. 8 is the line pulling apparatus of FIG. 1 having lines attached and positioned in a raceway shown in cross-section; and FIG. 9 the line pulling apparatus of FIG. 1 having a portion of a line attached.

DETAILED DESCRIPTION

Figure 1:
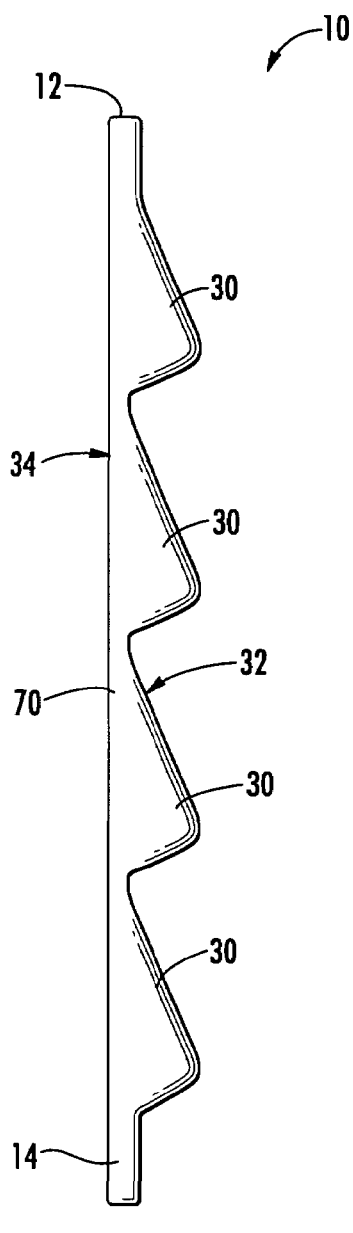
FIG. 1 is a side view of a line pulling apparatus according to various embodiments of the present invention.
Figure 2:
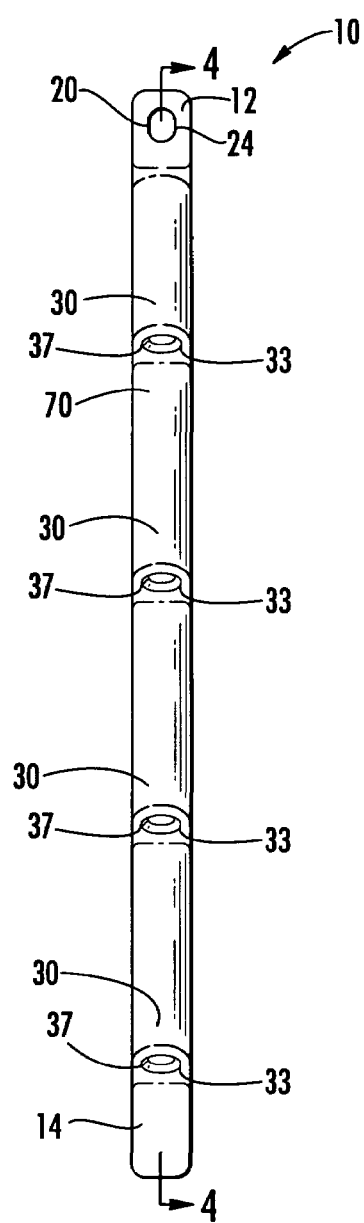
FIG. 2 is a top view of the line pulling apparatus of FIG. 1.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upper" or "lower" are relative characterizations only based upon the particular position or orientation of a given component for a particular application.

FIGS. 1–4 depict various embodiments of a line puller 10 that generally can be employed by a user, such as a technician (not shown) for example. The line puller 10 can be used to pull a line 800, or more than one line 800, through a raceway 900, as shown in FIG. 8. The raceway 900 may be, for example, a conduit, duct, enclosed channel, etc. The line puller 10 has an attachment portion 20 positioned on an end 12 of interconnected retainer portions 30. The interconnected retainer portions 30 have one-way locking passages 33 through the interconnected retainer portions 30 that are adapted to retain the line 800. Multiple one-way locking passages 33 are provided through the interconnected retainer portions 30.

In various embodiments, the interconnected retainer portions 30 form a single body 70. As shown, the body 70 includes the end 12, the interconnected retainer portions 30 and a trailing end 14. The interconnected retainer portions 30 are sized to fit within the raceway 900 as shown in FIG. 8. Further, the body 70 is flexible between the interconnected retainer portions 30 allowing the body 70 to negotiate bends and other obstacles within the raceway 900. In addition, the one-way locking passages 33 are positioned parallel to one another and have an entrance 37 that generally faces toward the trailing end 14. Such a configuration lends to allowing the interconnected retainer portions 30 to bypass obstacles in the raceway 900 as the one-way locking passages 33 open toward the trailing end 14. Thus, the interconnected retainer portions 30 are able to negotiate a multitude of obstacles due to the flexibility of the interconnected retainer portions 30 while securing the line 800, or more than one line 800, in the one-way locking passages 33.

Figure 3:
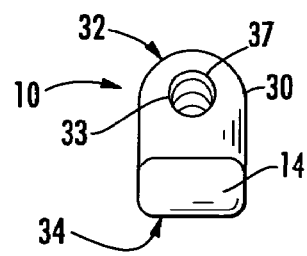
FIG. 3 is a rear view of the line pulling apparatus of FIG. 1.

FIG. 3 shows the interconnected retainer portions 30 having convex upper edges 32. As shown, the convex upper edges 32 are positioned about the entrances 37 of the one-way locking passages 33. In addition, the interconnected retainer portions 30 have planar lower edges 34 at exits 39 of the one way-locking passages 33.

As can be seen in FIGS. 4–4B, the one-way locking passages 33 are sized to receive the line 800. Alternatively, the one-way locking passage 33 may be sized to fit other shaped line for a different application. As the line 800 is received in the one one-way locking passage 33, it is retained from backing out of the one-way locking passage 33 by teeth 35. The teeth 35 define the inside of the one-way locking passage 33 and are positioned to receive the line 800 while preventing the removal of the line 800 through the entrance 37. Thus, when the line 800 is pushed into the one-way locking passage 33 through the entrance 37, the teeth 35 lock the line 800 in position in one direction preventing the line 800 from returning out of the entrance 37.

In various embodiments, the attachment portion 20 is an aperture 24. As shown in the drawings, the aperture 24 is positioned at the end 12 of the interconnected retainer portions 30. The attachment portion 20 can be releasably attached to an end 707 of a fish tape 700 as illustrated in FIG. 8. Thus, the attachment portion 20 is adapted to releasably attach to the end 707 of the fish tape 700 for pulling the line 800 through the raceway 900.

As shown, the interconnected retainer portions 30 allow the weight of each line 800 attached to the line puller 10 to be transferred directly to the fish tape 700. Thus, no one line 800 is additionally burdened with additional weight from additional lines 800 being attached. See FIG. 8. As such, the interconnected retainer portions 30 may be constructed from different materials having a sufficient tensile strength to carry multiple lines 800 such as, for example, metals, polymeric materials, etc. Thus, the line puller 10 generally is formed such that the line puller 10 is capable of carrying multiple lines 800.

Figure 6:
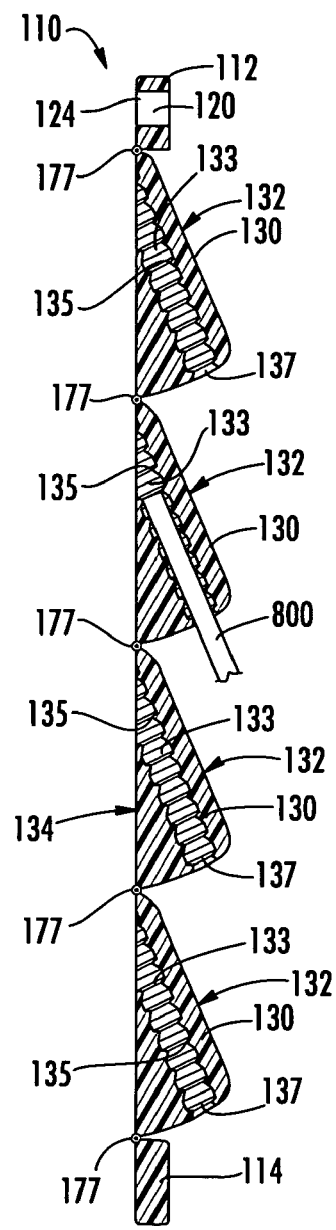
FIG. 6 is a cross-sectional view of the line pulling apparatus of FIG. 5 taken along the line 5—5.
Figure 5:
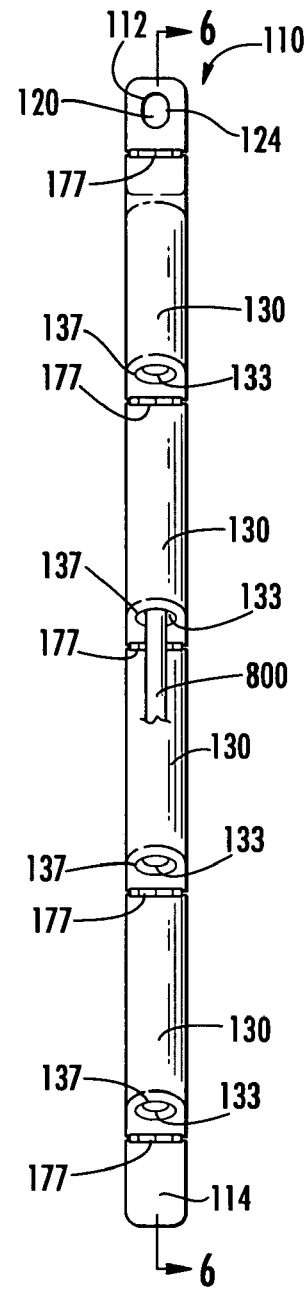
FIG. 5 is a top view of a line pulling apparatus according to various embodiments of the present.
Figure 7:
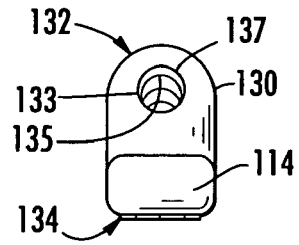
FIG. 7 is a rear view of the line pulling apparatus of FIG. 5.

FIGS. 5–7 illustrate various embodiments of a line puller 110 that generally can be employed to pull a line 800, or more than one line 800, through a raceway (not shown) in a similar manner as that shown in FIG. 8. The line puller 110 has an attachment portion 120 positioned on an end 112 of the interconnected retainer portions 130. In addition, the interconnected retainer portions 130 have one-way locking passages 133 through the interconnected retainer portions 130 that are adapted to retain the line 800. As shown, multiple one-way locking passages 133 are provided through the interconnected retainer portions 130 for multiple lines 800.

In various embodiments, the interconnected retainer portions 130 are connected to one another by hinges 177 at a base 134 between retainer portions 130. As shown, the hinges 177 connect the end 112, the interconnected retainer portions 130 and a trailing end 114. The interconnected retainer portions 130 are sized to fit within the raceway (not shown), in a similar manner as that shown in FIG. 8. Further, the hinges 177 provide pivoting flexibility between the interconnected retainer portions 130 allowing the line puller 110 to negotiate bends and other obstacles within the raceway. In addition, the one-way locking passages 133 are positioned parallel to one another and have an entrance 137 that generally faces toward the trailing end 114. Such a configuration provides the interconnected retainer portions 130 the ability to bypass obstacles in the raceway as the one-way locking passages 133 open toward the trailing end 114. Thus, the interconnected retainer portions 130 are able to negotiate a multitude of obstacles due to the pivoting flexibility of the interconnected retainer portions 130 while securing the line 800, or more than one line 800, in the interconnected retainer portions 130.

FIG. 7 shows the interconnected retainer portions 130 having convex upper edges 132. As shown, the convex upper edges 132 are positioned about the entrances 137 of the one-way locking passages 133. In addition, the one-way locking passages 133 are sized to receive the line 800. Alternatively, the one-way locking passages 133 may be sized to fit other shaped line for different applications. As the line 800 is received in the separate one-way locking passages 133, it is retained from backing out of the one-way locking passages 133 by teeth 135, similar to those illustrated in FIGS. 4–4B. The teeth 135 define the inside of the one-way locking passages 133 and are positioned to receive the line 800 while preventing the removal of the line 800 through the entrance 137. Thus, when the line 800 is pushed into separate one-way locking passages 133 through the entrance 137, the teeth 135 lock the line 800 in position in one direction preventing the line 800 from returning out of the entrance 137.

In various embodiments, the attachment portion 120 is an aperture 124. As shown in the drawings, the aperture 124 is positioned at the end 112 of the interconnected retainer portions 130. Thus, the attachment portion 120 can be releasably attached to an end of a fish tape (not shown), in a similar manner as that illustrated in FIG. 8, for pulling the line 800 through the raceway (not shown).

The interconnected retainer portions 130 allow the weight of each line 800 attached to the line puller 110 to be transferred directly to the fish tape (not shown). Thus, no one line 800 is additionally burdened with additional weight from additional lines being attached. As such, the interconnected retainer portions 130 may thus be constructed from different materials having a sufficient tensile strength to carry multiple lines such as, for example, metals, polymeric materials, etc. Thus, the line puller 110 generally is formed such that the line puller 110 is capable of carrying multiple lines.

As shown in FIG. 8, the lines 800, 802, 804, 806 are retained in separate one-way locking passages 33. The lines 800, 802, 804, 806 are pushed through separate one-way locking passages 33 that are housed in the interconnected retaining portions 30 and thus retained for pulling through the raceway 900. The lines 800, 802, 804, 806 are also secured by tape 600 to each other near the trailing end 14. Further, the lines 802, 804, 806 may be secured to other interconnected retaining portions 30 by tape 600. However, other ways of securing the lines 800, 802, 804, 806 may be used such as, for example, rubber bands, clips, etc.

In various embodiments, FIG. 8 illustrates the line puller 10 in the raceway 900 as it is pulled in the direction P. As shown, the line puller 10 has the lines 800, 802, 804, 806 retained through separate one-way locking passages 33 of the interconnected retainer portions 30. The lines 800, 802, 804, 806 are retained by the line puller 10 due to the lines 800, 802, 804, 806 being pushed into separate one-way locking passages 33. The line puller 10 is then attached to the end 707 of the fish tape 700 so that the line puller 10 can pull the lines 800, 802, 804, 806 in the direction P through the raceway 900.

FIG. 9 depicts the removal of the line 800 as it may be accomplished given the nature of the one-way locking passage 33. To remove the line 800, the line 800 is severed at 809 before the entrance 37 of the interconnected retaining portion 30 and then pushed further into the entrance 37. Once an end 808 of the line 800 reaches beyond the planar lower edges 34, the end 808 may be grasped and pulled out of the one-way locking passage 33. This will free the line 800 when desired.

As shown in the drawings, the line puller 10 has been depicted as having generally circular one-way locking passages 33. As well, in one embodiment the raceway 900 is cylindrical. The one-way locking passages 33 may be configured in a variety of shapes such that the line puller 10 is capable of attaching to the configuration of the line 800. Further, the line puller 10 may be configured to permit it to pass through the raceway 900 for which the line puller 10 is shaped to fit within. Other shapes and configurations of raceways (not shown) may include, but are not limited to ducts, enclosed channels, etc.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. An apparatus for pulling line through a raceway, the apparatus comprising:
    a plurality of interconnected retainer portions each having a one-way locking passage therethrough adapted to retain the line, at least one of the interconnected retainer portions further having a convex upper edge about an entrance to the one-way locking passage; and
    an attachment portion positioned on an end of the plurality of interconnected retainer portions.

2. The apparatus of claim 1, wherein the plurality of interconnected retainer portions is sized to fit within the raceway.

3. The apparatus of claim 1, wherein the plurality of interconnected retainer portions forms a single body.

4. The apparatus of claim 3, wherein the single body is flexible.

5. The apparatus of claim 1, wherein the plurality of interconnected retainer portions has a planar lower edge at an exit of the one-way locking passage.

6. The apparatus of claim 1, wherein the one-way locking passages are positioned parallel to one another.

7. The apparatus of claim 1, wherein at least one one-way locking passage of the plurality of interconnected retainer portions has the line positioned therethrough and retained.

8. The apparatus of claim 1, wherein the line is releasably secured to other interconnected retainer portions than the interconnected retainer portion retaining the line.

9. The apparatus of claim 1, wherein an entrance to the one-way locking passages faces toward a trailing end of the plurality of interconnected retainer portions.

10. The apparatus of claim 1, wherein the one-way locking passages are sized to received the line.

11. The apparatus of claim 1, wherein hinges connect the plurality of interconnected retainer portions to one another.

12. The apparatus of claim 11, wherein the binges are positioned between the plurality of interconnected retainer portions at the base of the plurality of interconnected retainer portions.

13. An apparatus for pulling line through a raceway, the apparatus comprising:
    a plurality of interconnected retainer portions each having a one-way locking passage therethrough adapted to retain the line, the one-way locking passages being positioned parallel to one another; and
    an attachment portion positioned on an end of the plurality of interconnected retainer portions.

14. The apparatus of claim 13, wherein the one-way locking passages are sized to receive the line.

15. The apparatus of claim 13, wherein the interconnected retainer portions are sized to fit within the raceway.

16. The apparatus of claim 13, wherein the attachment portion is sized to fit within the raceway.

17. An apparatus for pulling line through a raceway, the apparatus comprising:
    a plurality of interconnected retainer portions each having a one-way locking passage therethrough adapted to retain the line, the plurality of interconnected retainer portions being connected to one another by hinges: and
    an attachment portion positioned on an end of the plurality of interconnected retainer portions.

18. The apparatus of claim 17, wherein the hinges are positioned between the plurality of interconnected retainer portions at the base of the plurality of interconnected retainer portions.

* * * * *